United States Patent
Bukovec

(10) Patent No.: US 8,595,047 B2
(45) Date of Patent: Nov. 26, 2013

(54) AUTOMATICALLY-GENERATED WORKFLOW REPORT DIAGRAMS

(75) Inventor: Mai-Ian Tomsen Bukovec, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1441 days.

(21) Appl. No.: 11/352,865

(22) Filed: Feb. 13, 2006

(65) Prior Publication Data
US 2007/0192118 A1    Aug. 16, 2007

(51) Int. Cl.
*G06Q 10/00* (2012.01)

(52) U.S. Cl.
USPC .......................................... 705/7.26; 705/7.27

(58) Field of Classification Search
USPC ............................................ 705/7, 7.11–7.42
See application file for complete search history.

(56) References Cited

U.S. PATENT DOCUMENTS

| | | | | |
|---|---|---|---|---|
| 5,745,901 | A * | 4/1998 | Entner et al. ........................ | 1/1 |
| 5,835,898 | A * | 11/1998 | Borg et al. ........................ | 705/8 |
| 5,870,558 | A * | 2/1999 | Branton et al. ................. | 709/224 |
| 6,225,998 | B1 * | 5/2001 | Okita et al. .................... | 715/853 |
| 6,725,428 | B1 * | 4/2004 | Pareschi et al. ............... | 715/205 |
| 7,493,593 | B2 * | 2/2009 | Koehler ......................... | 717/106 |
| 2002/0040312 | A1 * | 4/2002 | Dhar et al. ........................ | 705/8 |
| 2003/0212518 | A1 * | 11/2003 | D'Alessandro et al. ........ | 702/84 |
| 2004/0148213 | A1 * | 7/2004 | Aziz et al. ........................ | 705/8 |
| 2004/0260593 | A1 * | 12/2004 | Abraham-Fuchs et al. ...... | 705/8 |
| 2005/0043982 | A1 * | 2/2005 | Nguyen ........................... | 705/8 |
| 2005/0066304 | A1 * | 3/2005 | Tattrie et al. ................... | 717/101 |
| 2005/0071243 | A1 * | 3/2005 | Somasekaran et al. ......... | 705/26 |
| 2005/0096950 | A1 * | 5/2005 | Caplan et al. ..................... | 705/7 |
| 2005/0154635 | A1 * | 7/2005 | Wright et al. .................. | 705/11 |
| 2006/0041467 | A1 * | 2/2006 | Canfield ......................... | 705/11 |
| 2006/0047540 | A1 * | 3/2006 | Hutten et al. ..................... | 705/4 |
| 2006/0125827 | A1 | 6/2006 | Adereth et al. | |
| 2006/0174210 | A1 * | 8/2006 | Richards et al. .............. | 715/769 |
| 2006/0230342 | A1 | 10/2006 | Nelson et al. | |
| 2007/0033129 | A1 * | 2/2007 | Coates ........................ | 705/36 R |
| 2007/0050340 | A1 * | 3/2007 | von Kaenel et al. ............. | 707/3 |

OTHER PUBLICATIONS

Hollingsworth "Workflow Management Coalition. The Workflow Reference Model" (1995) The Worklflow Management Coalition Specification.*
TeamSite workflow Developer's Guide Release 5.5.1 (2002). Interwoven.*
"ActionWorkflow Enterprise Series 3.0 Process Builder User's Guide" (1996) Action Technologies, Inc.*
Kolopoulous "The Workflow Imperative—Building Real World Business Solutions" (1995) Boston: Delphi Pub.*
Microsoft Biz Talk Server 2000 Documentation Guide (1999-2000) Microsoft Corporation.*

* cited by examiner

*Primary Examiner* — Johnna Loftis
*Assistant Examiner* — Sujay Koneru
(74) *Attorney, Agent, or Firm* — Perkins Coie LLP

(57) ABSTRACT

A facility for providing a workflow report document for a number of instances of a business process is described. In connection with information specifying the display of an arrangement of shapes each representing a constituent action of the business process, the facility provides information specifying the display in connection with shapes of the arrangement of at least one business process measure aggregated across all of the instances of the process.

16 Claims, 5 Drawing Sheets

| TypeID | UniqueID | ActionID | NextActionID | Status | Duration | |
|---|---|---|---|---|---|---|
| | | | | | action table | — 400 |
| 11 | 1 | 1 | 2 | concluded | 0 | — 401 |
| 11 | 1 | 2 | 3 | concluded | 5 | — 402 |
| 11 | 1 | 3 | 4 | concluded | 2 | — 403 |
| 11 | 1 | 4 | 9 | concluded | 0 | — 404 |
| 11 | 1 | 9 | 10 | concluded | 2 | — 405 |
| 11 | 1 | 10 | 0 | completed | 0 | — 406 |
| 11 | 2 | 1 | 2 | concluded | 0 | — 407 |
| 11 | 2 | 2 | 3 | concluded | 4 | — 408 |
| 11 | 2 | 3 | 4 | concluded | 1 | — 409 |
| 11 | 2 | 4 | 5 | concluded | 0 | — 410 |
| 11 | 2 | 5 | 6 | concluded | 3 | — 411 |
| 11 | 2 | 6 | 10 | concluded | 0 | — 412 |
| 11 | 2 | 10 | 0 | terminated | 0 | — 413 |
| ... | ... | ... | ... | ... | ... | |
| 451 | 452 | 453 | 454 | 455 | 456 | |

*FIG. 4*

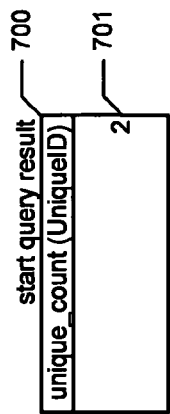
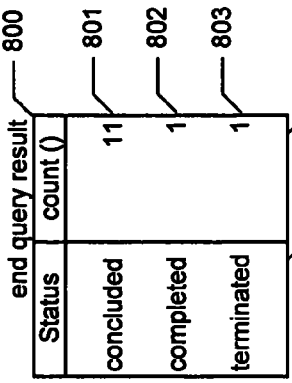
FIG. 7
FIG. 8
FIG. 6
FIG. 5

AUTOMATICALLY-GENERATED WORKFLOW REPORT DIAGRAMS

TECHNICAL FIELD

The described technology is directed to the fields of business process reporting and dynamic diagramming.

BACKGROUND

Business process management, which are essentially workflow and tracking software applications, enable a company to automate and track business processes, also called "workflows," that it uses frequently in its operation. For example, a company may use workflow tracking software to individually track the status of each of the number of different instances of an expense approval process, each of which must go through several different actions involving several different people.

To use such a workflow tracking application for a particular process, the company first defines the process in the workflow tracking application, such as by specifying the different actions that must be performed as part of the process, by whom, and in what order. Each time an instance of the process is started, the workflow tracking application is notified to identify the instance. Each time an action of the process is completed for an instance of the process, the workflow tracking application is notified so they can update its representation of the status of the instance.

Unfortunately, conventional workflow tracking applications have limited ways to display process instance status information for access and use by business users. In particular, these workflow tracking applications tend to display status information for one process instance at a time. Accordingly, a user of the workflow tracking application that wishes to understand the status of a large number of instances of a process must review individual reports on the status of each instance, and himself or herself aggregate this detailed information.

SUMMARY

A software facility automatically generates a workflow report diagrams diagram that represents different instances of a process. This report consists of a graphical diagram depicting the process with information about the collective status of a number of different instances of the process, such as those instances of the process that concluded during the past week. The information added to the diagram by the facility may show, in connection with particular actions, the number of instances in which the action was performed, the average length of time required to perform the action across all of the instances, and/or an alert flag indicating whether the action is being performed satisfactorily across all of the instances. Where an action involves a decision branching to two or more different paths, the facility may add information to the diagram indicating the number of instances that took each path. The facility may add information to the diagram indicating the number of instances that completed successfully and the number that failed. In various embodiments, the information added to the diagram can be refreshed manually; refreshed automatically at a user-specified interval; and/or refreshed automatically in an event-driven manner when the instance statuses maintained by the workflow tracking application change.

In some cases, the facility provides a user interface for collecting information from a user to define the report diagrams, including information associating shapes in the diagram with status information stored by a workflow tracking application, and information specifying tests for whether particular actions of the process are being performed satisfactorily.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a table diagram showing sample contents of an action table containing process instance status information used by the facility.

FIG. 5 is a table diagram showing a query result for deriving information used by the facility for task actions.

FIG. 6 is a table diagram showing a query result for deriving information used by the facility for decision actions.

FIG. 7 is a table diagram showing a query result for deriving information used by the facility for start actions.

FIG. 8 is a table diagram showing a query result for deriving information used by the facility for end actions.

DETAILED DESCRIPTION

A software facility for automatically generating workflow report diagrams ("the facility") is described. In some embodiments, the facility provides a user interface that enables a user to (1) associate shapes in a graphical diagram, each representing an action in the process with a location in a data store where the workflow tracking application stores information about the completion of the action by different instances of the process, and (2) define for some or all of the actions of the process conditions for displaying alerts in connection with the associated shapes in the diagram.

In response, the facility automatically augments the diagram with information retrieved from the data store about the collective status of a number of different instances of the process, such as those instances of the process that concluded during the past week. In some embodiments, the information added to the diagram by the facility shows, in connection with particular actions, the number of instances in which the action was performed, the average length of time required to perform the action across all of the instances, and/or an alert flag indicating whether the action is being performed satisfactorily across all of the instances. In some embodiments, where an action involves a decision branching to two or more different paths, the facility adds information to the diagram indicating the number of instances that took each path. In some embodiments, the facility adds information to the diagram indicating the number of instances that completed successfully in the number that failed. In various embodiments, the information added to the diagram can be refreshed manually; refreshed automatically at a user-specified interval; and/or refreshed automatically in an event-driven manner when the instance statuses maintained by the workflow tracking application change.

In various embodiments, the facility uses a variety of techniques for extracting instance status information maintained by a variety of workflow tracking applications, including employing database access techniques, processing an XML or XML variant version of the information generated by the workflow tracking application, and/or calling an API to retrieve the instance status information or register for updates to the instance status information. In some embodiments, the facility itself aggregates instance status information to obtain the information added to the diagram, while in others, the facility relies on the workflow tracking application or another helper application to perform such aggregation.

By automatically generating workflow report diagrams in some or all of the manners described above, the facility makes it easy to obtain information about how a business process being used in his or her company is performing, and at what points such performance needs improvement. It provides summary information for all the collective instances of the process, in a single graphical diagram.

Figure 1:
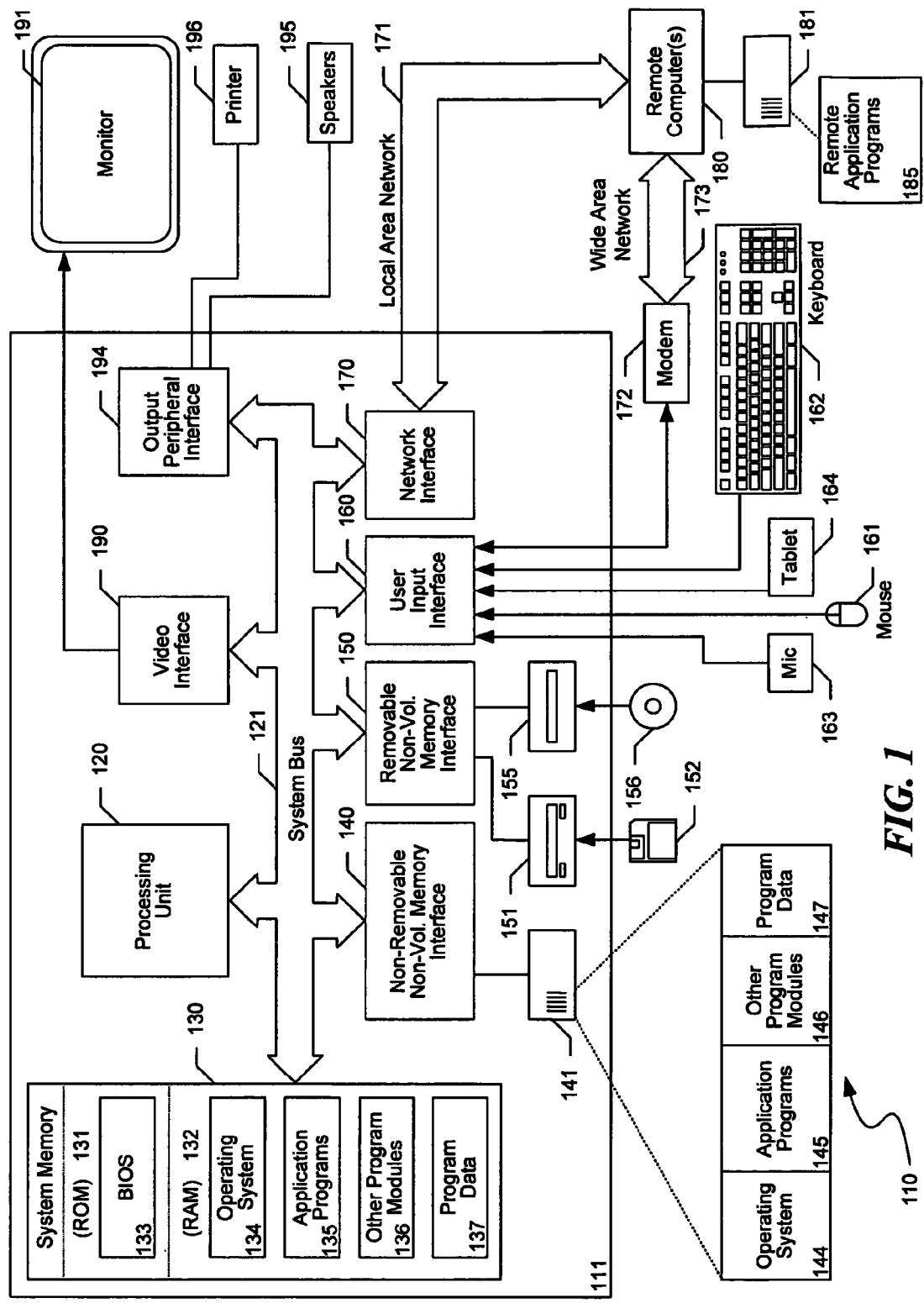
FIG. 1 is a block diagram illustrating an example of a suitable computing system environment or operating environment in which the facility may be implemented.

FIG. 1 is a block diagram illustrating an example of a suitable computing system environment 110 or operating environment in which the facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 111 typically includes a variety of computer-readable media. Computer-readable media can be any available media that can be accessed by the computer 111 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 111 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 111. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 111 is incorporated, such as in a tablet-type personal computer. In addition, computing devices such as the computer 111 may also include other peripheral output devices such as speakers 195 and a printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

In order to more fully describe the facility, its operation in connection with a specific example is discussed hereafter.

Figure 2:
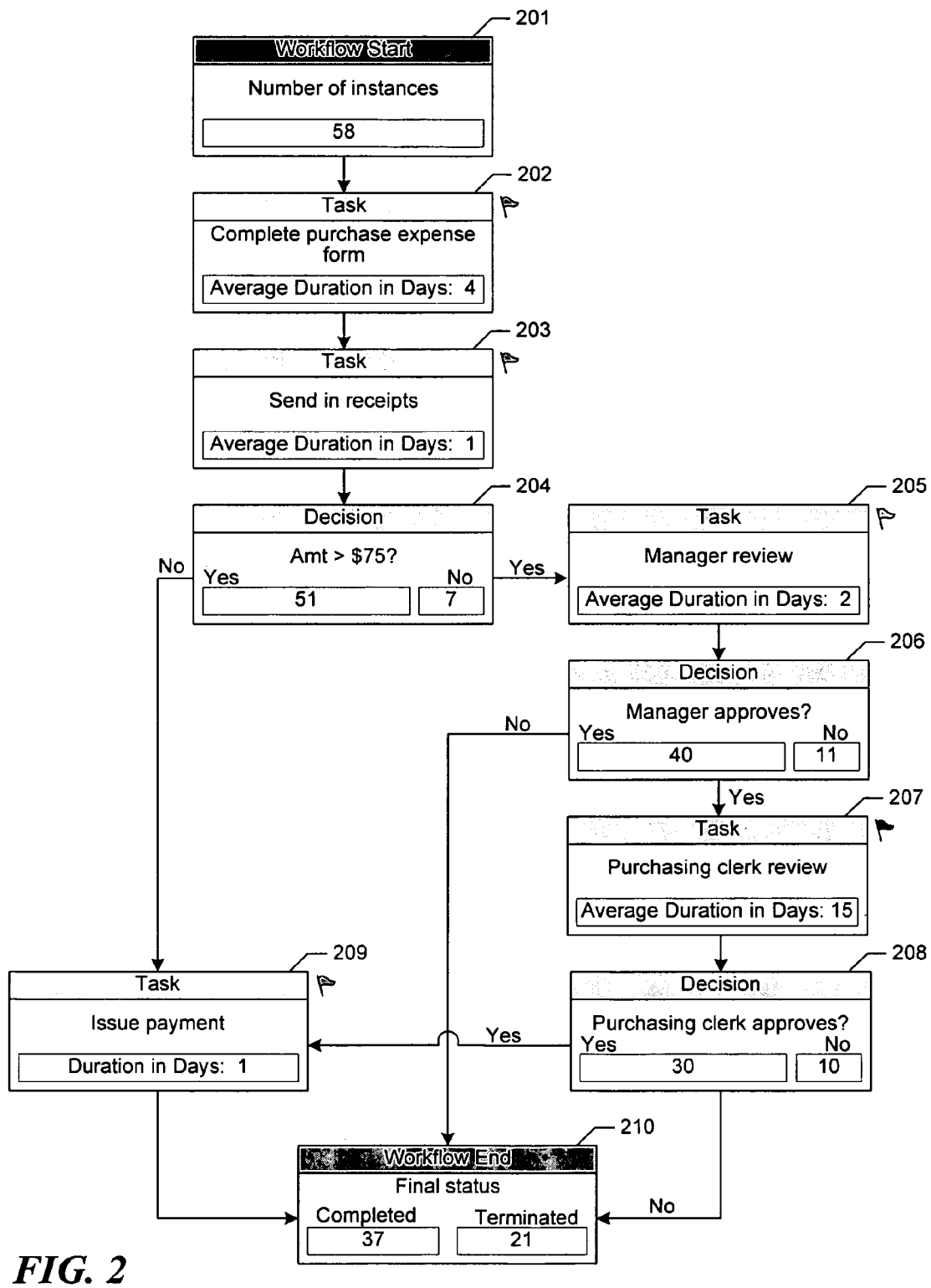
FIG. 2 is a report diagram showing a typical workflow report diagram generated by the facility.

FIG. 2 is a report diagram showing a typical workflow report diagram generated by the facility. The report is for an expense approval process, and is based upon a drawing created using the MICROSOFT VISIO application program made up of shapes 201-210. The report is for a period of time during which 58 instances of the process were performed. These instances are termed "subject instances," because they are the instances of the process that are the subject of the report. In various embodiments, the facility selects as subject instances all instances that began during a subject period, all instances that ended during the subject period, or all instances that both began and ended during the subject period. In some embodiments, rather than selecting subject instances based upon a subject period, for particular number of instances n, the facility selects the n most recently begun or most recently ended instances.

The facility has augmented start shape 201 by adding the total number of subject instances of the process, 58. The facility has augmented shape 202 for a "Complete purchase expense form" task by adding the following: the average duration of this task across the subject instances, 4 days, as well as a green flag, indicating that the task was performed satisfactorily during the subject instances; that is, the task has a satisfactorily short average duration across the subject instances. The facility has augmented shape 203 for a "Send in receipts" task by adding the following: the average duration of this task across the subject instances, 1 day, as well as a green flag indicating that the task was performed satisfactorily during the subject instances. The facility has augmented shape 204 for a "Amt>$75?" decision by adding the following: the total number of subject instances in which the no path to shape 209 was followed from this decision, 7, as well as the total number of subject instances in which the yes path to shape 205 was followed from this decision, 51. The facility has augmented shape 205 for a "Manager review" task by adding the following: the average duration of this task across the subject instances, 2 days, as well as a yellow flag indicating that the task was performed in a borderline fashion during the subject instances; that is, the task has an average duration across the subject instances that is in a range of medium acceptability. The facility has augmented shape 206 for a "Manager approves?" decision by adding the following: the total number of subject instances in which the no path to shape 210 was followed from this decision, 11, as well as the total number of subject instances in which the yes path to shape 207 was followed from this decision, 40. The facility has augmented shape 207 for a "Purchasing clerk review" task by adding the following: the average duration of this task across the subject instances, 15 days, as well as a red flag indicating that the task was performed on-unsatisfactorily during the subject instances; that is, the task has an average duration across the subject instances that exceeds a threshold of minimum acceptability. The facility has augmented shape 208 for a "Purchasing clerk approves?" decision by adding the following: the total number of subject instances in which the no path to shape 210 was followed from this decision, 10, as well as the total number of subject instances in which the yes path to shape 209 was followed from this decision, 30. The facility has augmented shape 209 for an "Issue payment" task by adding the following: the average duration of this task across the subject instances, 1 day, as well as a green flag indicating that the task was performed satisfactorily during the subject instances. The facility has augmented end shape 210 by adding the total number of subject instances that were successfully completed, 37 (all arriving from shape 209, 7 via the no path from shape 204 and 30 via the yes path from shape 208), as well as the total number of subject instances that were terminated, i.e., not successfully completed, 21 (11 via the no path from shape 206, 10 via the no path from shape 208).

It can be seen at the report provides valuable aggregate information about the overall operation of the process. The report shows that 37 of 58 reimbursement requests were granted, or 64%; in 7 of 51 or 14% of the instances, both of the Manager review and Purchasing clerk review actions were obviated by a policy exempting requests for amounts no larger than $75; the Complete purchase expense form action, Send in receipts action, and Issue payment action are all being performed promptly by those responsible for them, while the Purchasing clerk review action is a significant bottleneck likely to merit attention from a person responsible for the process, and the Manager review action may also need to be addressed.

In some embodiments, the facility generates the report in such a way that the user can click anywhere on the report to display a more detailed version of process instance status information for all of the subject instances and actions. In some embodiments, the facility generates a report in such a way that the user can drill down on details of particular portions of the report. For example, in some embodiments, the user can click on a shape in the report to obtain additional details about the corresponding action. In some embodiments, the user can click on a count of instances, such as a count of instances that exited a decision action along the particular path, to obtain additional details about those instances.

Those skilled in the art will appreciate that a variety of other presentation techniques may be used by the facility in augmenting the drawing. As one example, a wide variety of indicator types may be used to show the degree to which a shape's average duration is acceptable, such as smiling/frowning faces, arrows pointing up or down, etc. as another example, counts of instances may be portrayed in a variety of other ways, such as using bar or pie graphs.

In order to support the operation of the facility, templates for four different types of shapes are either included with the drawing program or provided as a supplement to the drawing program: a start shape, an end shape, a task shape, and a decision shape. The templates for all the shapes include a property identifying a particular action in the process as defined in the workflow tracking application to which the shape corresponds. The template for the start shape includes a property indicating the number of subject instances that can be linked to the appropriate point in the data source maintained by the workflow tracking application. The template for the end shape includes a property for each the number of subject instances completed and the number of subject instances terminated that can each be linked to the appropriate point in the data source maintained by the workflow tracking application. The template for the task shape includes a property indicating the average duration of the task that can each be linked to the appropriate point in the data source maintained by the workflow tracking application, as well as properties that can be set to establish duration ranges for displaying alert flags. The template for the decision shape includes a property for the number of instances following each of the paths out of the shape that can be linked to the appropriate point in the data source maintained by the workflow tracking application.

While creating the drawing using these shape templates, or after the drawing has been completed, the user sets the properties above to enable the facility to generate the report by populating the additional displayed properties for any set of subject instances of the process. As a first matter, the user sets shape properties that associate information to be displayed in connection with each shape with the location in the workflow tracking application's data store or a separate data feed produced from the workflow tracking application's data store where this information is available. As is described in greater detail below in connection with FIGS. 3-8, for most shapes this involves storing a copy of an ActionID identifying the action in the workflow tracking application to which the shape corresponds. In the case of decision shapes, this involves storing, for each branch from the decision shape, a label for the branch, as well as an ActionID identifying the action to which the branch leads. In some embodiments, the facility provides a user interface to facilitate the setting of these properties. In some embodiments, aspects of this user interface are implemented as described in U.S. patent application Ser. No. 11/012,875 filed on Dec. 15, 2004, now U.S. Pat. No. 7,564,458 issued Jul. 21, 2009, which is hereby incorporated by reference in its entirety. As a second matter, the user sets shape properties that specify average duration ranges that determine what color alert flag is displayed in connection with the shape for particular average duration value. In some embodiments, aspects of this user interface are implemented as described in U.S. patent application Ser. No. 11/105,115 filed on Apr. 11, 2005, now U.S. Pat. No. 7,747, 946 issued Jun. 29, 2010, which is hereby incorporated by reference in its entirety.

Figure 3:
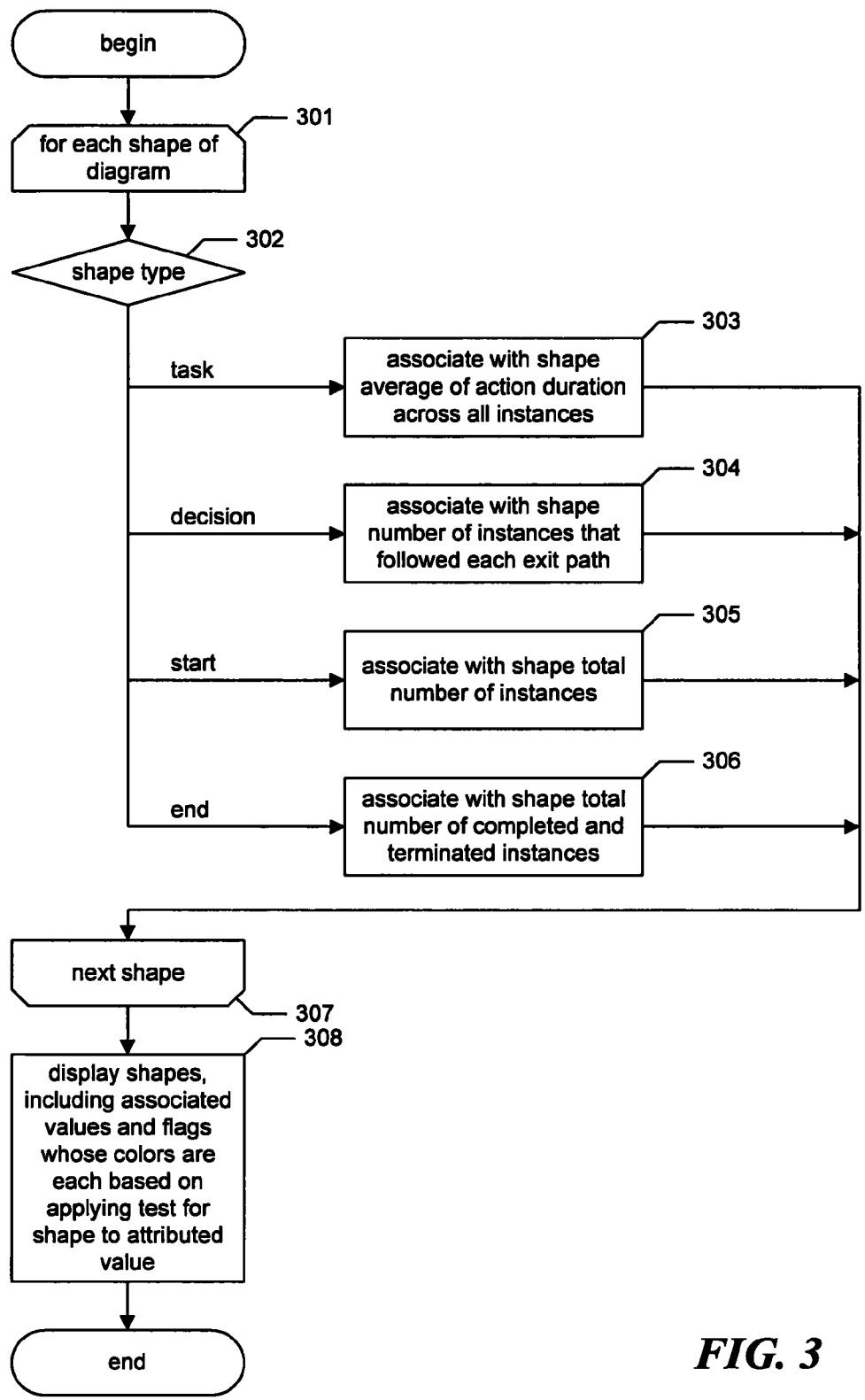
FIG. 3 is a flow diagram showing steps typically performed by the facility in order to generate a workflow report diagram.

FIG. 3 is a flow diagram showing steps typically performed by the facility in order to generate a workflow report diagram. After the process drawing has been created and the properties of its shapes set as discussed above, these steps can be performed at any time to generate a new workflow report diagram for the process, in response to either user or programmatic initiation. In some embodiments, these steps are repeated periodically in order to maintain up-to-date workflow report diagrams or in response to the expiration of a periodic polling interval.

In steps 301-307, the facility loops through each shape of the diagram. In step 302, the facility branches on the type of the shape to store in the shape the information needed for its shape type: if the shape is a task shape, then the facility continues in step 303; if the shape is a decision shape, then the facility continues in step 304; if the shape is a start shape, then the facility continues in step 305; if the shape is an end shape, then the facility continues in step 306. Different approaches used by the facility in various embodiments to obtain this information are described below after FIG. 3.

In step 303, the facility associates with the task shape the average action duration across all of the subject instances. After step 303, the facility continues in step 307. In step 304, the facility associates with the decision shape the number of subject instances that followed each exit path from the decision shape. After step 304, the facility continues in step 307. In step 305, the facility associates with the start shape the total number of subject instances. After step 305, the steps continue in step 307. In step 306, the facility associates with the end shape the total number of completed subject instances and the total number of terminated subject instances.

In step 307, if additional shapes remain in the diagram to be processed, then the facility continues in step 301 to process the next shape of the diagram, else the facility continues in step 308. In step 308, the facility displays the shapes of the diagram, including both the values associated with each shape in steps 303-306 and, in the case of some or all of the task shapes, flags whose colors are each based upon applying a test specified for the shape to and attributed average duration value. After step 308, these steps conclude.

Those skilled in the art will appreciate that the steps shown in FIG. 3 may be altered in a variety of ways. For example, the order of the steps may be rearranged; substeps may be performed in parallel; shown steps may be omitted, or other steps may be included; etc.

In some embodiments, the process instance status information used by the facility is directly extracted from the database maintained by the workflow tracking application, either by the facility or an intermediary program. FIG. 4 is a table diagram showing sample contents of an action table containing process instance status information used by the facility. The action table 400 is made up of rows, including rows 401-413, each corresponding to a particular action of a particular process instance. Note that, while the sample contents of this table that are shown correspond generally to the example shown in FIG. 2, for the sake of brevity, rows are included for only two of the 58 instances depicted in that example. Each row is divided into the following columns: a TypeID column 451 containing a TypeID value corresponding to the process type to which the row corresponds, here an expense reimbursement process; a UniqueID column 452 containing a UniqueID value identifying a particular instance of the process to which the row corresponds; an ActionID column 453 containing an ActionID value identifying a particular action of the process to which the row corresponds; NextActionID column 454 containing the ActionID of the action that was performed in the instance of the process to which this row corresponds immediately after the action to which this row corresponds; a status column 455 that indicates the result of performing the action to which this row corresponds (The status "concluded" means that the action to which the row corresponds has finished; the status "completed" means that the instance to which the row corresponds succeeded; and the status "terminated" means that the instance to which the row corresponds failed); and a duration column 456 indicating the amount of time that the actions which the row corresponds took to complete, expressed here in days. For example, rows 401-406 indicate that instance 1 of the process began in action 1, which concluded in zero days; the instance continued in action 2, which concluded in five days; the instance continued in action 3, which concluded in two days; the instance continued in action 4, which concluded in zero days; the instance continued in action 9, which concluded two days; and the instance continued in action 10, where it completed in zero days.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc. Indeed, the contents of various fields may be encoded in different ways than the ways that are shown here for legibility. For example, any of the contained IDs may be represented as globally-unique IDs. Also, the status values may be encoded as whole number values or using other constant representations. Further, duration values may be expressed in a number of different units, or may be expressed with reference to absolute times at which the action began and/or ended.

FIGS. 5-8 show query results that can be derived from the action table and used to support the operation of the facility. It should be noted that, to facilitate comparison between FIGS. 5-8 in FIG. 4, only the rows explicitly shown in FIG. 4 have been used to generate the contents of FIGS. 5-8. Also, though not discussed explicitly below, in some embodiments the facility selects rows in a way that is also based upon TypeID and other qualifiers for subject instances, such as instance start and/or end date.

FIG. 5 is a table diagram showing a query result for deriving information used by the facility for task actions. The query result 500 contains, for each unique ActionID contained in the action table, the average of the duration values among the rows containing that action ID. For example, row 502 indicates that the action having ActionID 2 took an average of 4.5 days to perform, based on the intersection of rows 402 and 408 with Duration column 456. If FIG. 5 reflected the full contents of the action table supporting the report shown in FIG. 2, row 502 would instead report an average duration of 4 days as shown in shape 202.

FIG. 6 is a table diagram showing a query result for deriving information used by the facility for decision actions. The query result 600 contains, for each unique combination of ActionID and NextActionID contained in the action table, the number of rows containing that combination. For example, row 604 indicates that the decision action having ActionID 4 took the yes path to action 5 in one instance based on the contents of row 410, while row 604 indicates that the decision action having ActionID for took the no path to action 209 in one instance based on the contents of row 404. If FIG. 6 reflected the full contents of the action table supporting the report shown in FIG. 2, the table would instead report 51 instances in row 604 and 7 instances in row 605 as shown in shape 204.

FIG. 7 is a table diagram showing a query result for deriving information used by the facility for start actions. The query result 700 contains a unique count of all of the UniqueID values in the action table, which is reflective of the number of subject instances displayed in start shapes. Row 701 indicates that the table contains two of these, based on rows 401-406 and 407-413. If FIG. 6 reflected the full contents of the action table supporting the report shown in FIG. 2, row 701 would instead report a value of 58 as shown in shape 201.

FIG. 8 is a table diagram showing a query result for deriving information used by the facility for end actions. The query result 800 contains, for each unique status value contained in the action table, the number of rows containing that status value. Row 802 indicates that 1 action completed based on row 406, while row 803 indicates that one action terminated based on row 403. If FIG. 5 reflected the full contents of the action table supporting the report shown in FIG. 2, the table would instead report 37 in row 802 and 21 in row 803 as shown in shape 210.

In some embodiments, the process instance status information used by the facility is converted from a form in which is maintained by the workflow tracking application into an XML or SolutionXML document, either by workflow tracking application, the facility, or an intermediary program. In some embodiments, this information is converted from a form defined by the Business Process Modeling Notation specification available at www.bpmn.org.

The SolutionXML representation uses the tags described below in Table 1.

TABLE 1

| | | |
|---|---|---|
| 1 | <TypeID> | corresponds to column 451 of action table |
| 2 | <UniqueID> | corresponds to column 452 of action table |
| 3 | <Action ID> | corresponds to column 453 of action table |
| 4 | <NextActionID> | corresponds to column 454 of action table |
| 5 | <Status> | corresponds to column 455 of action table |
| 6 | <Duration> | corresponds to column 456 of action table |

A version of the information contained in the action table shown in FIG. 4 represented in SolutionXML is shown below in Table 2.

TABLE 2

| | |
|---|---|
| 1 | <TypeID> 11 |
| 2 | <UniqueID> 1 |
| 3 | <ActionID> 1 |
| 4 | <NextActionID> 2 |
| 5 | <Status> concluded |
| 6 | <Duration> 0 |
| 7 | </ActionID> |
| 8 | <ActionID> 2 |
| 9 | <NextActionID> 3 |
| 10 | <Status> concluded |
| 11 | <Duration> 5 |
| 12 | </ActionID> |
| 13 | <ActionID> 3 |
| 14 | <NextActionID> 4 |
| 15 | <Status> concluded |
| 16 | <Duration> 2 |
| 17 | </ActionID> |
| 18 | <ActionID> 4 |
| 19 | <NextActionID> 9 |
| 20 | <Status> concluded |
| 21 | <Duration> 0 |
| 22 | </ActionID> |
| 23 | <ActionID> 9 |
| 24 | <NextActionID> 10 |
| 25 | <Status> concluded |
| 26 | <Duration> 2 |
| 27 | </ActionID> |
| 28 | <ActionID> 10 |
| 29 | <NextActionID> 0 |
| 30 | <Status> completed |
| 31 | <Duration> 0 |
| 32 | </ActionID> |
| 33 | </UniqueID> |
| 34 | <UniqueID> 2 |
| 35 | <ActionID> 1 |
| 36 | <NextActionID> 2 |
| 37 | <Status> concluded |
| 38 | <Duration> 0 |
| 39 | </ActionID> |
| 40 | <ActionID> 2 |
| 41 | <NextActionID> 3 |
| 42 | <Status> concluded |
| 43 | <Duration> 4 |
| 44 | </ActionID> |
| 45 | <ActionID> 3 |
| 46 | <NextActionID> 4 |
| 47 | <Status> concluded |
| 48 | <Duration> 1 |
| 49 | </ActionID> |
| 50 | <ActionID> 4 |
| 51 | <NextActionID> 5 |
| 52 | <Status> concluded |
| 53 | <Duration> 0 |
| 54 | </ActionID> |
| 55 | <ActionID> 5 |
| 56 | <NextActionID> 6 |
| 57 | <Status> concluded |
| 58 | <Duration> 3 |
| 59 | </ActionID> |

TABLE 2-continued

| | |
|---|---|
| 60 | </ActionID> 6 |
| 61 | <NextActionID> 10 |
| 62 | <Status> concluded |
| 63 | <Duration> 0 |
| 64 | </ActionID> |
| 65 | <ActionID> 10 |
| 66 | <NextActionID> 0 |
| 67 | <Status> terminated |
| 68 | <Duration> 0 |
| 69 | </ActionID> |
| 70 | </UniqueID> |
| 71 | </TypeID> |

In order to obtain the average duration for a task shape from the SolutionXML representation, the facility divides the sum of the values of the <Duration> tags under the <ActionID> tags containing the ActionID value corresponding to the shape by the number of <ActionID> tags containing the ActionID value corresponding to the shape. In Table 2, for shape 2, the facility averages five days from the <Duration> tag in line 11 with four days from the <Duration> tag in line 43 to obtain a result of 4.5 days.

In order to obtain the number of instances that followed each exit path from a decision shape, the facility counts the number of each value of the <NextActionID> tag under the <ActionID> tags containing the ActionID value corresponding to the shape. In Table 2 for shape 4, the facility counts one exit along the no path in line 19 and one exit along the yes path in line 51.

In order to obtain the total number of subject instances for a start shape, the facility counts the number of unique values among the <UniqueID> tags. In Table 2 for shape 1, the facility counts unique value 1 of the <UniqueID> tag in line 2 and unique value 2 of the <UniqueID> tag in line 34 to obtain a result of two instances.

In order to obtain the total number of completed and terminated instances for an end shape, the facility counts the <UniqueID> tags having each completed and terminated values of <Status> tags under <ActionID> tags containing the ActionID value corresponding to the shape. In Table 2 for shape 10, the facility counts one completed iteration in line 30 and one terminated iteration in line 67.

In some embodiments, rather than a SolutionXML representation that separately reflects each action of each iteration, the facility uses a SolutionXML representation that contains aggregations across all subject iterations for each action. An example of such a SolutionXML representation is shown below in Table 3.

TABLE 3

| | |
|---|---|
| 1 | <TypeID> 11 |
| 2 | 21 ActionID> 1 |
| 3 | <NextActionID> |
| 4 | <2> 2 |
| 5 | </NextActionID> |
| 6 | <Status> |
| 7 | <concluded> 2 |
| 8 | </Status> |
| 9 | <Duration> 0 |
| 10 | </ActionID> |
| 11 | <ActionID> 2 |
| 12 | <NextActionID> |
| 13 | <3> 2 |
| 14 | </NextActionID> |
| 15 | <Status> |
| 16 | <concluded> 2 |
| 17 | </Status> |
| 18 | <Duration> 4.5 |
| 19 | </ActionID> 3 |

TABLE 3-continued

```
20          <NextActionID>
21              <4> 2
22          </NextActionID>
23          <Status>
24              <concluded> 2
25          </Status>
26          <Duration> 1.5
27      </ActionID>
28      <ActioniD> 4
29          <NextActionID>
30              <5> 1
31              <9> 1
32          <Status>
33              <concluded> 2
34          </Status>
35          <Duration> 0
36      </ActionID> 5
37          <NextActionID>
38              <6> 1
39          </NextActionID>
40          <Status>
41              <concluded> 1
42          </Status>
43          <Duration> 3
44      </ActionID>
45      </ActionID> 6
46          <NextActionID>
47              <10> 1
48          </NextActionID>
49          <Status>
50              <concluded> 1
51          </Status>
52          <Duration> 0
53      </ActionID> </ActionID> 9
54          <NextActionID>
55              <10> 1
56          </NextActionID>
57          <Status>
58              <concluded> 1
59          </Status>
60          <Duration> 2
61      </ActionID>
62      <ActionID> 10
63          <NextActionID>
64              <0> 2
65          </NextActionID>
66          <Status>
67              <completed> 1
68              <terminated> 1
69          </Status>
70          <Duration> 0
71      </ActionID>
72  </TypeID>
```

It will be appreciated by those skilled in the art that the above-described facility may be straightforwardly adapted or extended in various ways. For example, the facility may be used in connection with a wide variety of workflow tracking applications, drawing applications, and process instance status and drawing data formats. While the foregoing description makes reference to particular embodiments, the scope of the invention is defined solely by the claims that follow and the elements recited therein.

I claim:

1. A method performed by a computing system for constructing a workflow report document comprising:
   with a computer, accessing a drawing document depicting a business process, the business process being a workflow having constituent actions, the workflow specifying by whom and in what order the constituent actions are to be performed, the drawing document comprising a plurality of shapes each corresponding to a constituent action of the business process, wherein the plurality of shapes comprise at least: a shape corresponding to a task, a shape corresponding to a decision, a shape corresponding to a start, and a shape corresponding to an end, and wherein the performance of each constituent action across a plurality of iterations of the business process is tracked in an action-tracking data store and each shape is represented by a shape data structure;
   for the shape corresponding to the task, with a computer, receiving user input specifying a reference for the task into the action-tracking data store usable to obtain performance-tracking information for the task across the plurality of iterations of the business process, such that the reference is usable to obtain an average of the duration of the task across all iterations that performed the task;
   storing the reference for the task in the shape data structure representing the shape corresponding to the task;
   for the shape corresponding to the decision, with a computer, receiving user input specifying a reference for the decision into the action-tracking data store usable to obtain performance-tracking information for the decision across the plurality of iterations of the business process, such that the reference is usable to obtain a number of iterations that followed each exit path of the decision;
   storing the reference for the decision in the shape data structure representing the shape corresponding to the decision;
   for the shape corresponding to the start, with a computer, receiving user input specifying a reference for the start into the action-tracking data store usable to obtain performance-tracking information for the start across the plurality of iterations of the business process, such that the reference is usable to obtain a total number of iterations;
   storing the reference for the start in the shape data structure representing the shape corresponding to the start;
   for the shape corresponding to the end, with a computer, receiving user input specifying a reference for the end into the action-tracking data store usable to obtain performance-tracking information for the end across the plurality of iterations of the business process, such that the reference is usable to obtain a number of completed iterations; and
   storing the reference for the end in the shape data structure representing the shape corresponding to the end.

2. The method of claim 1, further comprising displaying a wizard in response to which the received user input is provided by the user.

3. The method of claim 1, further comprising, for each of the shapes of the plurality associated with a reference:
   using the stored reference to obtain from the action-tracking data store performance-tracking information for the constituent action to which the shape corresponds across the plurality of iterations of the business process; and
   displaying the obtained performance-tracking information in the drawing document in connection with the shape.

4. The method of claim 1, further comprising, for a distinguished shape of the plurality corresponding to a second task:
   receiving user input specifying an average duration threshold for the second task to which the distinguished shape corresponds; and
   storing an indication of the specified average duration threshold in the shape data structure representing the distinguished shape.

5. The method of claim 4, further comprising:
   retrieving the indication of the specified average duration threshold from the shape data structure representing the distinguished shape;

if the average amount of time required to perform the second task for which the distinguished shape corresponds across all iterations of the business process that performed the second task does not exceed the specified average duration threshold, displaying in connection with the distinguished shape a graphical indication having a positive connotation; and if the average amount of time required to perform the distinguished action across all iterations of the business process that performed the second task exceeds the specified average duration threshold, displaying in connection with the distinguished shape a graphical indication having a negative connotation.

6. The method of claim 1, further comprising:
selecting a shape;
attributing a performance value to the selected shape; and
applying a test for the selected shape to the attributed performance value.

7. A computing system for displaying a dynamic graphical report comprising:
a memory storing a drawing document depicting a workflow having constituent actions, the workflow specifying by whom and in what order the constituent actions are to be performed, the drawing document comprising a plurality of shapes each corresponding to a constituent action of the workflow, wherein the plurality of shapes comprise at least:
a shape, associated with a first reference into an action-tracking data store, corresponding to a task,
a shape, associated with a second reference into the action-tracking data store, corresponding to a decision,
a shape, associated with a third reference into the action-tracking data store, corresponding to a start, and
a shape, associated with a fourth reference into the action-tracking data store, corresponding to an end, and
wherein the performance of each constituent action across a plurality of iterations of the business process is tracked in the action-tracking data store and each shape is represented by a shape data structure;
an accessing subsystem configured to obtain performance-tracking information for a constituent action of the business process such that,
for the shape corresponding to the task, the accessing subsystem uses the first reference to obtain an average of the duration of the task for all instances that performed the task,
for the shape corresponding to the decision, the accessing subsystem uses second the reference to obtain a number of instances that followed each exit path of the decision,
for the shape corresponding to the start, the accessing subsystem uses the third reference to obtain a total number of instances, and
for the shape corresponding to the end, the accessing subsystem uses the fourth reference to obtain a number of completed instances; and
a display subsystem that displays the stored drawing document in connection with a visual indication of the obtained performance-tracking information.

8. The computing system of claim 7 wherein the accessing subsystem and display subsystem operate in response to the expiration of a polling interval.

9. The computing system of claim 7 wherein the accessing subsystem and display subsystem operate in response to a notification that the contents of the action-tracking data store have changed.

10. The system of claim 7,
wherein a performance value is attributed to the constituent action for which the accessing subsystem obtains performance-tracking information across a plurality of instances of the workflow, and
wherein the visual indication that is displayed in connection with the stored drawing document is based, at least in part, on a test of the obtained performance-tracking information that is applied to the performance value.

11. A computer-readable storage device whose contents are capable of causing a computing system to perform operations for constructing a workflow report document, the operations comprising:
accessing a drawing document depicting a business process, the business process being a workflow having constituent actions, the workflow specifying by whom and in what order the constituent actions are to be performed, the drawing document comprising a plurality of shapes each corresponding to a constituent action of the business process, wherein the plurality of shapes comprise at least: a shape corresponding to a task, a shape corresponding to a decision, a shape corresponding to a start, and a shape corresponding to an end, and wherein the performance of each constituent action across a plurality of iterations of the business process is tracked in an action-tracking data store and each shape is represented by a shape data structure;
for the shape corresponding to the task, with a computer, receiving user input specifying a reference for the task into the action-tracking data store usable to obtain performance-tracking information for the task across the plurality of iterations of the business process, such that the reference is usable to obtain an average duration of the task for all iterations that performed the task;
storing the reference for the task in the shape data structure representing the shape corresponding to the task;
for the shape corresponding to the decision, with a computer, receiving user input specifying a reference for the decision into the action-tracking data store usable to obtain performance-tracking information for the decision across the plurality of iterations of the business process, such that the reference is usable to obtain a number of iterations that followed each exit path of the decision;
storing the reference for the decision in the shape data structure representing the shape corresponding to the decision;
for the shape corresponding to the start, with a computer, receiving user input specifying a reference for the start into the action-tracking data store usable to obtain performance-tracking information for the start across the plurality of iterations of the business process, such that the reference is usable to obtain a total number of iterations;
storing the reference for the start in the shape data structure representing the shape corresponding to the start; and
for the shape corresponding to the end, with a computer, receiving user input specifying a reference for the end into the action-tracking data store usable to obtain performance-tracking information for the end across the plurality of iterations of the business process, such that the reference is usable to obtain a number of completed iterations; and storing the reference for the end in the shape data structure representing the shape corresponding to the end.

12. The computer-readable storage device of claim 11, the operations further comprising displaying a wizard in response to which the received user input is provided by the user.

13. The computer-readable storage device of claim 11, the operations further comprising, for each of the shapes of the plurality associated with a reference:
   using the stored reference to obtain from the action-tracking data store performance-tracking information for the constituent action to which the shape corresponds across the plurality of instances of the business process; and
   displaying the obtained performance-tracking information in the drawing document in connection with the shape.

14. The computer-readable storage device of claim 11, wherein the task is a first task and wherein the operations further comprise, for a distinguished shape of the plurality corresponding to a second task:
   receiving user input specifying an average duration threshold for the second task to which the distinguished shape corresponds; and
   storing an indication of the specified average duration threshold in the shape data structure representing the distinguished shape.

15. The computer-readable storage device of claim 14, the operations further comprising:
   retrieving the indication of the specified average duration threshold from the shape data structure representing the distinguished shape;
   if the average amount of time required to perform the second task for which the constituent action corresponds across all iterations of the business process that performed the second task does not exceed the specified average duration threshold, displaying in connection with the distinguished shape a graphical indication having a positive connotation; and
   if the average amount of time required to perform the distinguished action across all iterations of the business process that performed the second task exceeds the specified average duration threshold, displaying in connection with the distinguished shape a graphical indication having a negative connotation.

16. The computer-readable storage device of claim 11, the operations further comprising:
   selecting a shape;
   attributing a performance value to the selected shape; and
   applying a test for the selected shape to the attributed performance value.

* * * * *